Nov. 18, 1941.    T. E. BOSWORTH    2,263,260
OPHTHALMIC MOUNTING
Filed Feb. 12, 1940
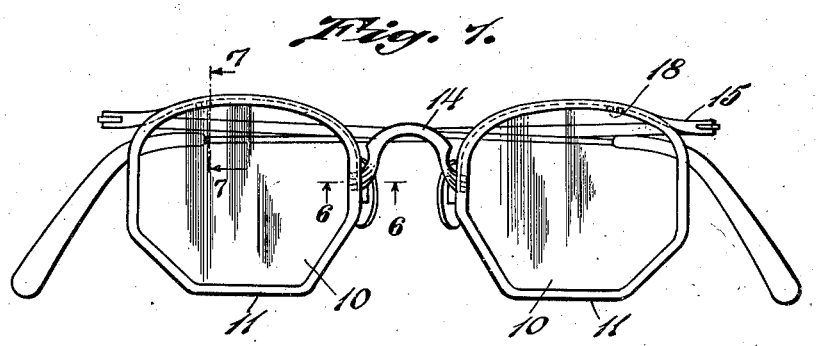
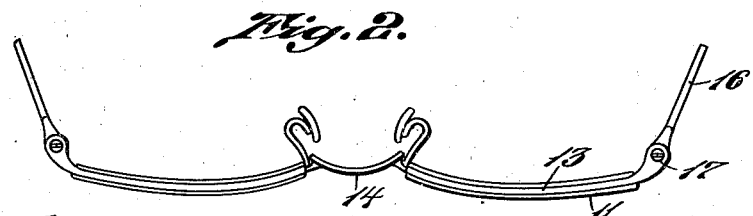
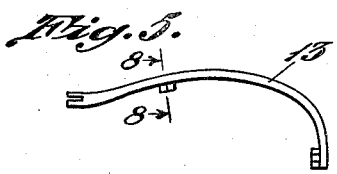
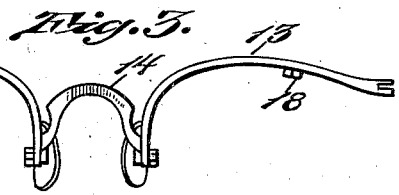
INVENTOR.
Thomas E. Bosworth
BY Barlow & Barlow
ATTORNEYS.

Patented Nov. 18, 1941

2,263,260

UNITED STATES PATENT OFFICE 2,263,260

OPHTHALMIC MOUNTING

Thomas E. Bosworth, Cranston, R. I., assignor to Universal Optical Company, Inc., a corporation of Rhode Island Application February 12, 1940, Serial No. 318,540

2 Claims. (Cl. 88—47)

This invention relates to an ophthalmic mounting and has for one of its objects to combine a non-metallic rim with a curved metal mounting bar so that each strengthens the other in the mounting.

Another object of this invention is to provide a curved bar for mounting the temples and to conceal this bar and at the same time strengthen the bar and the mounting with which it is associated.

Another object of the invention is to eliminate the necessity of the use of a strap and the piercing of the lens for the mounting of either a bridge or the temples in position.

With these and other objects in view, the invention consists of certain novel features of construction, as will be more fully described, and particularly pointed out in the appended claims.

In the accompanying drawing:

Fig. 1 is a face view of a spectacle in conformity with this invention.

Fig. 2 is a top plan view of the same.

Fig. 3 is a face view of the metal parts with the rims and lenses omitted.

Fig. 4 is a top plan view of the structure shown in Fig. 3.

Fig. 5 is one of the single curved bars detached from the remainder of the mounting.

Fig. 6 is a section on line 6—6 of Fig. 1.

Fig. 7 is a section on line 7—7 of Fig. 1.

Fig. 8 is a section on line 8—8 of Fig. 4.

Fig. 9 is an enlarged view looking at the inner surface of one of the rims showing the means of attachment of the curved bar to the rim.

It is desirable in certain cases to provide a metal bridge and curved bars mounted upon the bridge at one end of the bar and supporting the temples at the outer end of the bar, eliminating the necessity of piercing the lens for mounting the temples and the provision of a strap for this purpose. In such cases it is usual to conceal the metal bar back of the lens along the upper edge of the lens. In some cases rims are provided in such a construction and the bar concealed behind the rim at the upper edge of the lens. However, in order to strengthen the structure and utilize the rim for this purpose, I have grooved the upper edge of the rim and set the curved bar into this groove which serves to both strengthen the rim and strengthen the metal bar and also serves to effectively conceal the metal bar so that it will not be visible. I also provide a mounting in which the lens does not need to be pierced and the consequent breakage from strain on the lens or from the operation of drilling which is performed is eliminated, and the following is a more detailed description of the present embodiment of this invention, illustrating the preferred means by which these advantageous results may be accomplished:

With reference to the drawing, 10 designates the lens and 11 a rim which extends about the edge of the lens. This rim is of non-metallic material such, for instance, as Celluloid, Xylonite or the like, and which may be of a color close to the color of glass or the material which forms the lens. A groove is provided in the rim and the lens is usually inserted by heating the rim to expand the same, positioning the glass in place, and then allowing the rim to cool.

These rims 11 are recessed or grooved as at 12 along their outer upper surface and a metal curved bar 13, which is secured to a bridge 14 in any suitable manner such, for instance, as by soldering, is located in this groove 12 to extend along the groove or recess and then to leave the groove to provide portions 15 for the mounting of the temples 16 as by the hinged joints 17. The bar is of such cross-section that it is largely hidden in the recess. This curved bar is provided with prongs 18 which extend thru the rim 11 at suitable intervals to be upset or bent over the inner grooved surface 19 of the non-metallic rim to hold the bar securely in position and to draw the bar snugly into the recess 12 and conceal the same from view.

By this mounting the strain which may be imposed upon the temples and transmitted from them is transmitted into the curved bar which is well supported by reason of the groove in which it lies and snugly fits in the rim. No piercing of the lens is necessary, the rim supports the bar and the bar supports the rim, each cooperating to take a portion of the strain and strengthen each other and the entire structure.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, lens rims each having a longitudinally extending recess formed in the upper peripheral edge of the rim, each of said recesses having a downwardly directed end portion extending only partially along the nasal marginal side edge of its associated rim and terminating at a point thereon adjacent to one end of a bridge when the bridge extends transversely between the lens rims to connect them together, a bridge, curved bars each secured to said bridge and located in said recess in one of the rims, and means securing said parts in such assembled relation, said means comprising two prongs on said bar extending into said rim, one of said prongs being located in proximity to the outer marginal side edge of the lens rim and the other prong being positioned adjacent to said bridge.

2. In an ophthalmic mounting, lens rims each having a longitudinally extending recess formed in the upper peripheral edge of the rim, each of said recesses having a downwardly directed end portion extending only partially along the nasal marginal side edge of its associated rim and terminating at a point thereon adjacent to one end of a bridge when the bridge extends transversely between the lens rims to connect them together, a bridge, curved bars each secured to said bridge and located in said recess in one of the rims, and means securing said parts in such assembled relation, said means comprising two prongs on said bar extending into and through said rim and upset on the inner surface thereof, one of said prongs being located in proximity to the outer marginal side edge of the lens rim and the other prong being positioned adjacent to said bridge.

THOMAS E. BOSWORTH.